(12) United States Patent
Heines et al.

(10) Patent No.: US 8,855,575 B2
(45) Date of Patent: Oct. 7, 2014

(54) DEVICE-VEHICLE INTEROPERABILITY VERIFICATION METHOD

(75) Inventors: Richard F. Heines, Ortonville, MI (US); Christopher L. Oesterling, Troy, MI (US)

(73) Assignee: General Motors LLC, Detroit, MI (US)

( * ) Notice: Subject to any disclaimer, the term of this patent is extended or adjusted under 35 U.S.C. 154(b) by 225 days.

(21) Appl. No.: 13/473,522

(22) Filed: May 16, 2012

(65) Prior Publication Data
US 2013/0309977 A1 Nov. 21, 2013

(51) Int. Cl.
*H04B 17/00* (2006.01)

(52) U.S. Cl.
USPC ........ 455/67.7; 455/66.1; 455/41.2; 455/418; 455/466; 455/550.1; 455/556.2; 340/12.23; 340/5.23; 340/426.1; 701/36; 701/49; 701/119; 709/220; 709/229

(58) Field of Classification Search
USPC ........... 455/66.1, 418, 41.2, 67.7, 466, 556.2, 455/550.1; 340/12.23, 426.1, 5.23, 5.26; 701/36, 49, 119; 709/220, 229
See application file for complete search history.

(56) References Cited

U.S. PATENT DOCUMENTS

| | | | | | |
|---|---|---|---|---|---|
| 5,963,129 | A | * | 10/1999 | Warner | 340/468 |
| 6,965,326 | B2 | * | 11/2005 | Allison | 340/999 |
| 7,006,819 | B2 | * | 2/2006 | Mazzara et al. | 455/418 |
| 7,015,792 | B2 | * | 3/2006 | Lessard et al. | 340/5.61 |
| 7,049,709 | B2 | * | 5/2006 | Boggs | 307/10.2 |
| 7,092,799 | B2 | * | 8/2006 | Oesterling et al. | 701/1 |
| 7,142,810 | B2 | * | 11/2006 | Oesterling | 455/9 |
| 7,142,959 | B2 | * | 11/2006 | Oesterling et al. | 701/32.4 |
| 7,215,950 | B2 | * | 5/2007 | Mazzara et al. | 455/418 |
| 7,302,315 | B2 | * | 11/2007 | Oesterling et al. | 701/1 |
| 7,305,294 | B2 | * | 12/2007 | Bate et al. | 701/93 |
| 7,346,370 | B2 | * | 3/2008 | Spaur et al. | 455/556.1 |
| 7,346,439 | B2 | * | 3/2008 | Bodin | 701/36 |
| 7,506,309 | B2 | * | 3/2009 | Schaefer | 717/120 |
| 7,689,325 | B2 | * | 3/2010 | Farrow | 701/2 |
| 7,796,972 | B2 | * | 9/2010 | Jiddou | 455/405 |
| 7,818,098 | B2 | * | 10/2010 | Koepf et al. | 701/1 |
| 7,999,654 | B2 | * | 8/2011 | Taki et al. | 340/5.64 |
| 8,239,076 | B2 | * | 8/2012 | Mcgarry et al. | 701/2 |
| 8,321,524 | B2 | * | 11/2012 | Hering et al. | 709/217 |
| 2003/0188303 | A1 | * | 10/2003 | Barman et al. | 717/170 |
| 2004/0203692 | A1 | * | 10/2004 | Schwinke et al. | 455/419 |
| 2005/0017851 | A1 | | 1/2005 | Allison | |
| 2005/0245272 | A1 | | 11/2005 | Spaur et al. | |
| 2012/0019360 | A1 | * | 1/2012 | McGinn et al. | 340/5.73 |
| 2012/0166346 | A1 | * | 6/2012 | Machlab et al. | 705/317 |

* cited by examiner

*Primary Examiner* — Marceau Milord
(74) *Attorney, Agent, or Firm* — Dierker & Associates, P.C.

(57) ABSTRACT

A device-vehicle interoperability verification method is disclosed herein. Vehicle information is obtained by a mobile communications device, and this vehicle information pertains to a vehicle within which the device is being used or is going to be used. The vehicle information and device identification information is transmitted from the device to a server. The transmission occurs in response to a command generated by an application resident on the device, which includes computer readable code, embedded on a tangible, non-transitory computer readable medium, for performing the transmission. A data aggregator at the server queries a database to obtain data pertaining to an interoperability between the device and the vehicle, and a communications module at the server sends a message to the device that includes at least the data pertaining to the interoperability between the device and the vehicle.

20 Claims, 4 Drawing Sheets

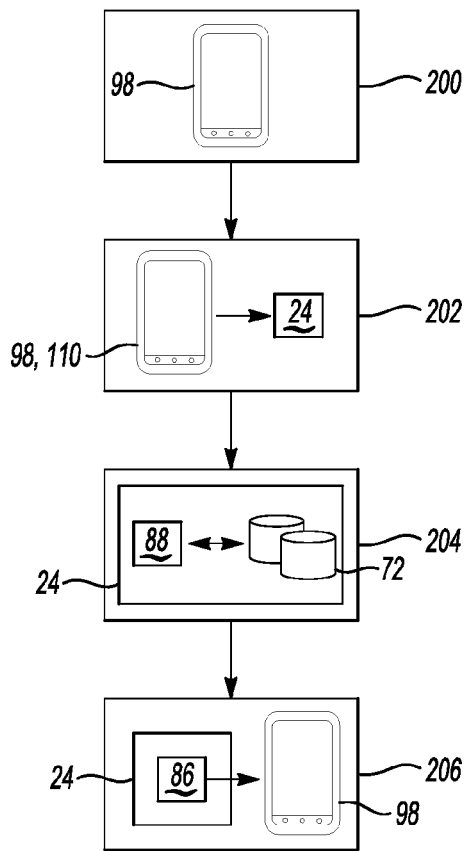
_Fig-2_
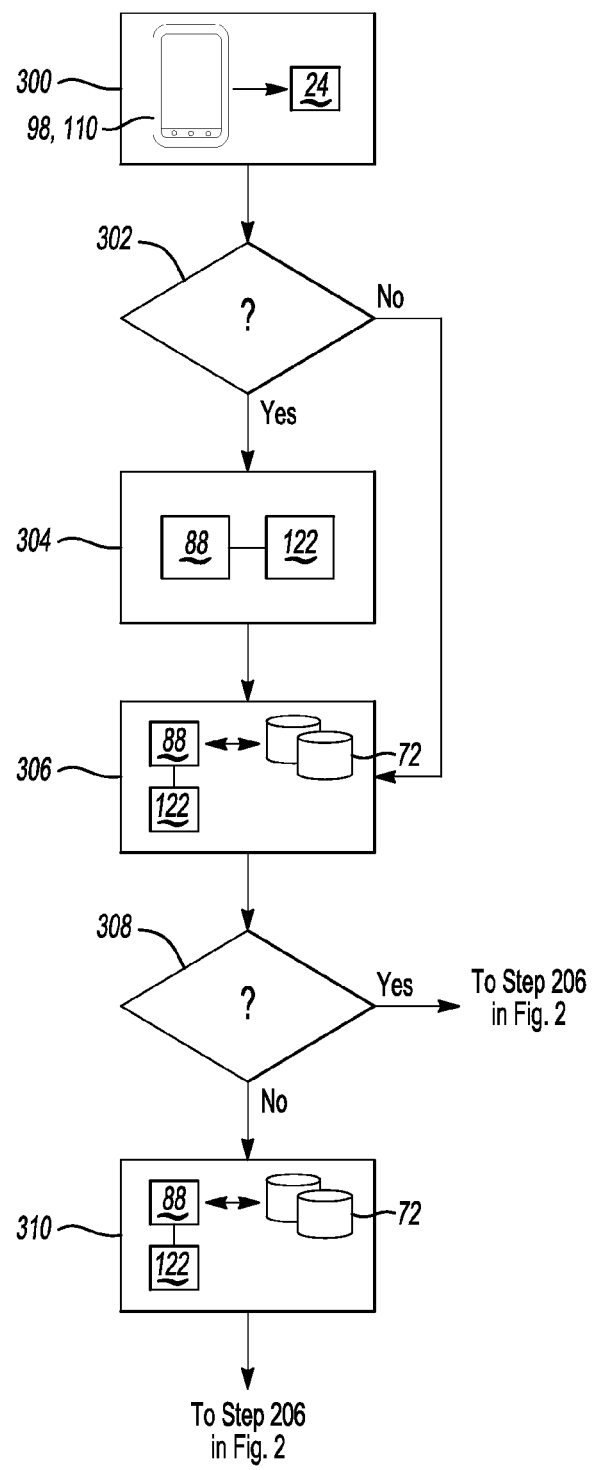
_Fig-3_

DEVICE-VEHICLE INTEROPERABILITY VERIFICATION METHOD

TECHNICAL FIELD

The present disclosure relates generally to device-vehicle interoperability verification methods.

BACKGROUND

Mobile communications devices are sometimes used inside a mobile vehicle. In some instances, the mobile vehicle is actually utilized in conjunction with the mobile communications device. For example, the driver may connect his/her device to an in-vehicle telematics unit via a short range wireless connection (e.g., a BLUETOOTH® connection) so that the driver can utilize the device hands-free while driving. In some instances, the driver may have to consult an online database to determine if his/her mobile communications device is compatible with the vehicle.

SUMMARY

Examples of a device-vehicle interoperability verification method are disclosed herein. In one example of the method, vehicle information is obtained by a mobile communications device, where the vehicle information pertains to a vehicle within which the device is being used or going to be used. The vehicle information and mobile communications device identification information is transmitted from the device to a server. An application resident on the device includes computer readable code, embedded on a tangible, non-transitory computer readable medium, for performing the transmitting. By a data aggregator at the server, a database is queried to obtain data pertaining to an interoperability between the mobile communications device and the vehicle, and a message is sent to the device from a communications module at the server. The message includes at least the data pertaining to the interoperability between the mobile communications device and the vehicle.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 2 is a flow diagram depicting an example of a device-vehicle interoperability verification method;

FIG. 3 is a flow diagram depicting an example of a method performed by a server to determine an interoperability between a mobile communications device and a vehicle.

DETAILED DESCRIPTION

Figure 1:
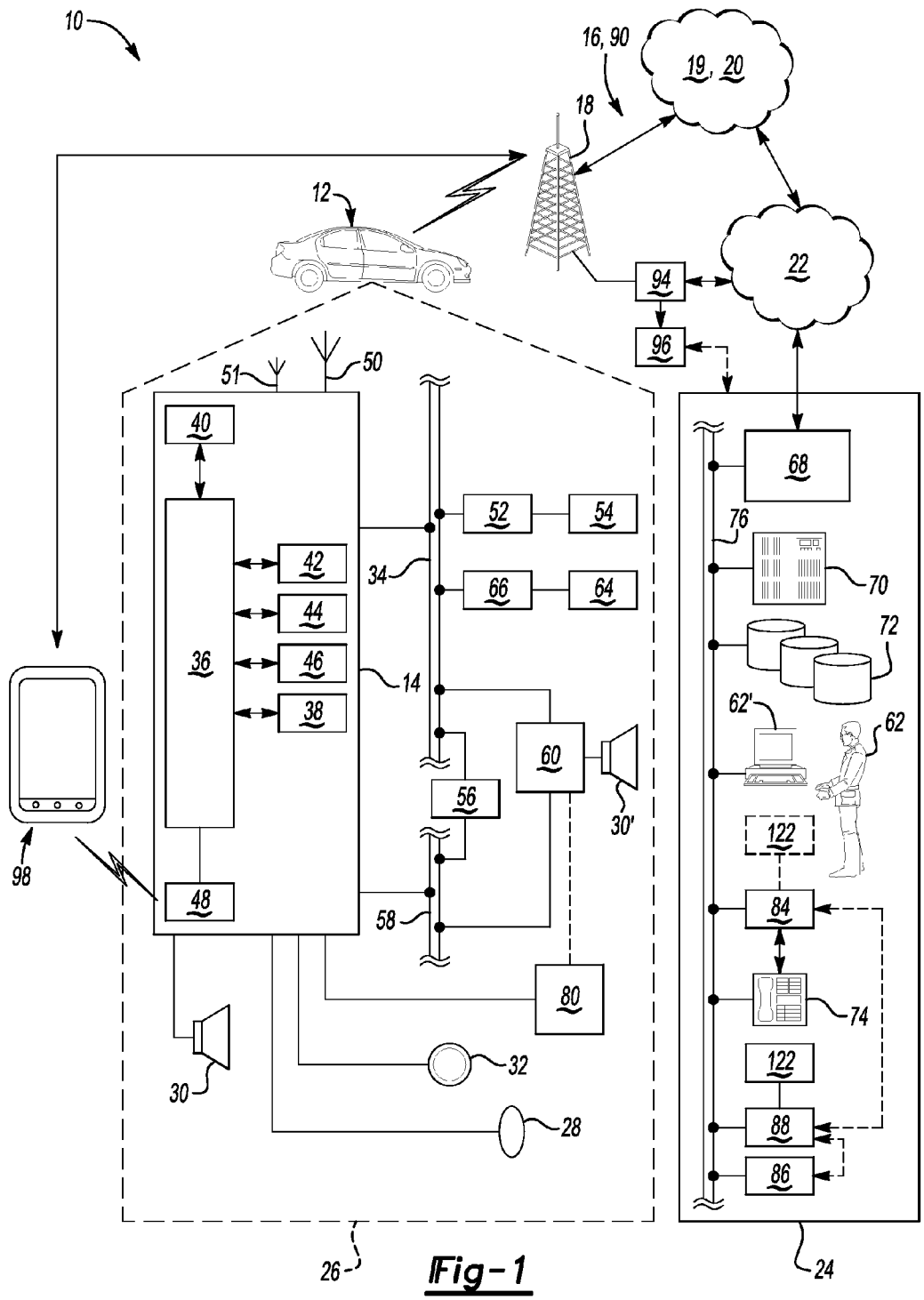
FIG. 1 is a schematic diagram depicting an example of a device-vehicle interoperability verification system.

In-house testing is often performed by vehicle manufacturers to assess an interoperability between mobile communications devices and vehicles within which the devices may be disposed and operated. Data derived from the testing may, for example, be organized and presented in a consumer-accessible resource, such as in an online interoperability file(s) that is/are reachable through a consumer-accessible webpage. The organized data presented in the consumer-accessible resource may, for example, identify the type of device that was tested for use in a specific vehicle, and whether or not the device is compatible (in whole or in part) with the vehicle. In some instances, the consumer-accessible resource may also provide some advice or instructions to enable a user of the device to configure the device for use in a particular vehicle.

The examples of the method disclosed herein may be used by a consumer or user of a mobile communications device to quickly determine whether or not features (e.g., BLUETOOTH® or Wi-Fi™ connectivity capabilities, etc.) of his/her device are compatible with a particular vehicle without the user having to access the consumer-accessible resource. One example of the method may be used to determine if the user's device is compatible with a prospective vehicle for purchase; e.g., at a dealership before the user purchases the vehicle. In some instances, the method may be used to provide a suggestion for how to correct an incompatibility of the device with the vehicle, or a suggestion of another vehicle that is already compatible with the device. Another example of the method may be used to determine if a new device is compatible with a user's existing vehicle. In instances where the new device is not compatible, the method may also be used to provide advice and/or instructions for how to make the new device compatible with the vehicle.

It is believed that the method disclosed herein may reduce customer complaints and/or other dissatisfactions with respect to the usability of the customer's existing mobile device inside a new vehicle purchase. In some cases, the method may also reduce the number of buy-backs by the vehicle dealer and/or manufacturer in part because of mobile device-vehicle incompatibility issues. By some of the examples of the method, the user will be able to easily verify the mobile device-vehicle interoperability prior to the purchase of the vehicle. In other words, some examples of the method may be used to educate prospective buyers about the interoperability of their mobile device with a particular vehicle. It is further believed that some examples of the method may be used to provide, to the user, mobile device operating instructions for use inside a particular vehicle, such as in instances where the user has purchased a new mobile device and wishes to use that device in his/her existing vehicle.

As used herein, the term "user" refers to any person in possession of a mobile communications device, and the user, in an example, may be a vehicle owner, a vehicle driver, and/or a vehicle passenger. In instances where the user is the vehicle owner, the term "user" may be used interchangeably with the terms subscriber and/or service subscriber. Further, when the user owns the mobile communications device, owns a vehicle within which the mobile communications device is to be used, or is intending to purchase a new vehicle within which the mobile communications device is going to be used, the user may also be referred to as a customer or consumer.

Further, a mobile device to be used inside the vehicle is one that is connected to the vehicle with or without a wire. By this connection, and so long as the device is compatible with the vehicle, functions of the device may be performed utilizing one or more vehicle systems. For example, calling and call-receiving functions of the mobile device may be performed utilizing a telematics unit of the vehicle once the device has been connected to the vehicle, e.g., through a short range wireless connection such as a BLUETOOTH® connection or a Wi-Fi™ connection. In another example, an audio playing function of, e.g., mp3s stored on the device may be performed utilizing the audio component disposed in the vehicle once the device has been connected to the vehicle, e.g., via a wire.

Additionally, the term "interoperability" or "compatibility" is used in connection with functions/features of the mobile communications device (e.g., calling function, call-receiving function, Internet accessing function, etc.), and refers to the ability of the function(s)/feature(s) of the mobile device to work when used inside and/or connected to a vehicle. In instances where an "interoperability issue" or a "compatibility issue" exists, at least one function/feature of the device does not work when used inside vehicle. In other words, the function(s)/feature(s) of the device is/are incompatible with the vehicle.

Further, an "application" is a software program that may be downloaded to, and stored on the mobile communications device. It is to be understood that when an application is stored on the device, the application is said to be resident on the device. An example of an application (e.g., the application 110 shown in FIG. 1B) includes computer readable code embedded on a non-transitory, tangible computer readable medium for performing various functions, such as for extracting information from a source (e.g., a vehicle identification (VIN) tag) and transmitting the information from the device to a server (such as a server of a telematics service provider). The application 110 may also be used to receive interoperability information from the server, to provide messages to the mobile device pertaining to its interoperability with a particular vehicle type, to provide advice for how to make the device compatible with a particular vehicle, to provide a suggestion of another vehicle that is already compatible with the mobile device, etc. In an example, the application 110 (also referred to herein as the "app 110") may be downloaded to the mobile device from another server of a telematics service provider. The server from which the application 110 may be downloaded may be different from the server of the telematics service center 24, which receives information transmitted thereto from the mobile device during the examples of the method disclosed herein. In another example, the telematics service center 24 may have a centralized app server specifically constructed to provide mobile apps for a variety of tasks including telematics-related tasks and/or non-telematics-related tasks. This app server may be located at the telematics service center 24, or remote from the telematics service center 24 (e.g., at another facility). Downloading the app 110 may be accomplished, for example, by accessing a webpage owned and/or run by the telematics service provider, and selecting or purchasing the application. The downloadable version of the application 110 may otherwise be obtained from an application store, e.g., iTunes®, Google® Apps, the Android Marketplace, or the like.

Furthermore, the mobile device may be any mobile communications device capable of storing and running applications (i.e., "apps") thereon. Some examples of these mobile devices include smartphones (e.g., iPhone®, Android™, and the like), tablet computers (e.g., iPad® or the like), and laptop computers. It is believed that mobile communications devices that are not capable of storing and running apps thereon may, in some instances, also be used. An example of such devices includes cellular phones.

The term "communication" is to be construed to include all forms of communication, including direct and indirect communication. Indirect communication may include communication between two components with additional component(s) located therebetween.

Further, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

FIG. 1 described in detail below depicts a device-vehicle interoperability verification system (identified by reference numeral 10). This system 10 may be used to perform the steps of the examples of the device-vehicle interoperability verification method described below in conjunction with FIGS. 2-4. For purposes of the instant disclosure, the system 10 utilizes a mobile communications device (identified in FIG. 1 by reference numeral 98), and as described above, the mobile device is a portable communications device capable of running apps that are resident thereon. The system 10 shown in FIG. 1 also utilizes a car as the vehicle 12 within which the mobile device 98 is being used (e.g., the vehicle 12 is already owned by the user) or is going to be used (e.g., the vehicle 12 is a prospective vehicle that the user may wish to purchase (e.g., from a dealer) at some point in the future).

Aside from the vehicle 12 and the mobile communications device 98, the system 10 depicted in FIG. 1 further includes a telematics unit 14, a carrier/communication system 16 (including one or more cell towers 18, one or more base stations 19 and/or mobile switching centers (MSCs) 20, and one or more service providers (e.g., 90) including mobile network operator(s)), one or more land networks 22, and one or more telematics call centers 24. In an example, the carrier/communication system 16 is a two-way radio frequency communication system, and may be configured with a web application supporting system-to-system communications (e.g., communications between the telematics call center 24 and the service provider 90).

The wireless carrier/communication system 16 may be used to establish communication between a mobile communications device (e.g., the device 98) and the telematics unit 14. For example, the user of the device 98 (e.g., when outside the vehicle 12) may call the telematics unit 14 over the wireless carrier/communication system 16. However, for devices having short range wireless connection capabilities (such as the device 98), when such devices are located within close proximity (i.e., a distance suitable for short range wireless communication) of the telematics unit 14, communication between such devices and the telematics unit 14 may be established via short range wireless connection (e.g., by pairing the telematics unit 14 and the device 98 using a BLUETOOTH® connection or the like). In one example, the device 98 is in close proximity of the telematics unit 14 when the device 98 is inside the passenger compartment (i.e., the cabin area) of the vehicle 12.

In an example, the carrier/communication system 16 also includes a host server 94 including suitable computer equipment (not shown) upon which information of a remotely accessible page 96 resides/is stored. For instance, the remotely accessible page 96 may be a webpage set up and maintained by a telematics service provider, and the user may access the page 96 by, e.g., submitting personal information (e.g., a login ID) and authenticating information (e.g., a password, a PIN, etc.). The computer equipment used to log into the page 96 may also include hardware which, for example, can receive and read a smart card for identification/authentication purposes, or can utilize biometrics for identification/authentication purposes.

In an example, the webpage 96 may be accessed by a user to obtain information pertaining to the compatibility of his/her mobile device 98 with the vehicle 12 within which the device 98 is being used or is going to be used. In other words, the information (i.e., the interoperability data) is stored in, for example, an interoperability file and/or in a database that is accessible by the user through the webpage 96. When interoperability file(s) is/are utilized, the interoperability file(s) is/are also stored in one of the databases at, and is/are accessible by a server (e.g., a server located at a call center 24 or a separate server). In an example, the interoperability data may include information identifying different types of devices for use in specific vehicles, and which features of the respective devices are supported by the specific vehicles. The interoperability data may further include instructions for how to make a particular device compatible with a particular vehicle type. It is to be understood that the examples of the method described below may provide interoperability data to the user without the user having to access the data through the webpage 96. In some instances, however, the user may be instructed to access the webpage 96 to obtain additional interoperability information, e.g., detailed directives for how to make his/her device 98 compatible with a particular vehicle. The instruction for the user may be included as part of a suggestion contained in a message for the user's device 98, where such message is generated during an example of the method disclosed herein. It is further to be understood that the webpage 96 is available to the user anytime the user wishes to access the data by the user's own initiative.

The overall architecture, setup, and operation, as well as many of the individual components of the system 10 shown in FIG. 1 are generally known in the art. Thus, the following paragraphs provide a brief overview of one example of the system 10. It is to be understood, however, that additional components and/or other systems not shown here could employ the methods disclosed herein.

Figure 1A:
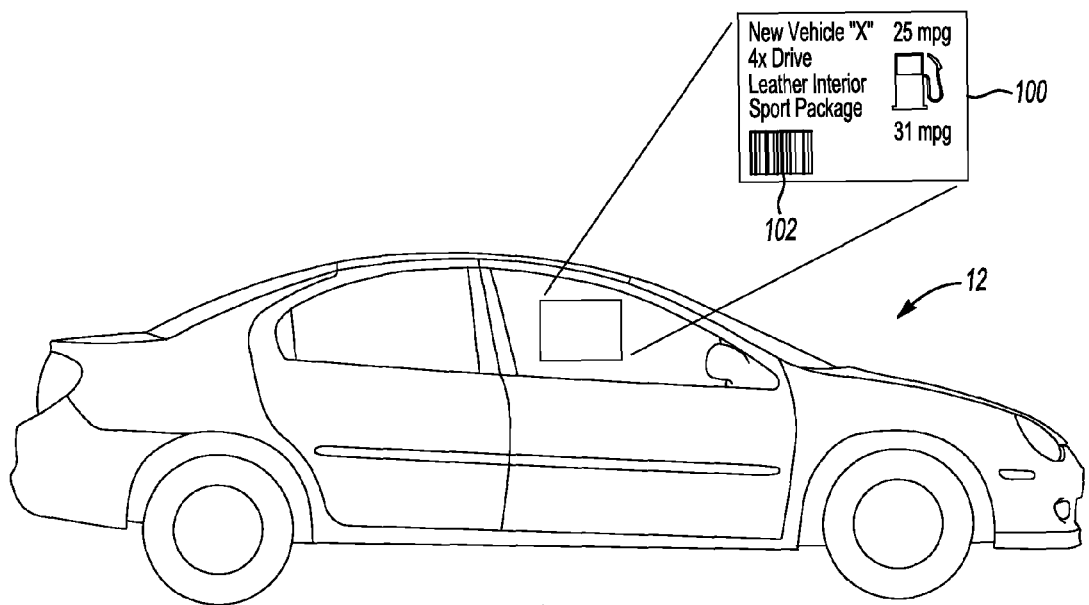
FIG. 1A semi-schematically depicts an example of a vehicle including an example of a vehicle identification tag attached thereto.

Vehicle 12 may be a mobile land vehicle (such as a motorcycle, car, truck, recreational vehicle (RV), or the like), a water vehicle (such as a boat) or an air vehicle (such as a plane, helicopter, or the like), and the vehicle 12 is equipped with suitable hardware and software that enables it to communicate (e.g., transmit and/or receive voice and data communications) over the carrier/communication system 16. In instances where the vehicle 12 is a prospective vehicle, as shown in FIG. 1A, the vehicle 12 may have a vehicle identification tag 100 displayed on a surface thereof, such as on a vehicle window as shown. The identification tag 100 may contain vehicle information in human-readable form. Example vehicle information includes the make, model, and year of the vehicle 12, vehicle components and/or features, expected fuel mileage, etc. In an example, the identification tag 100 may be a radio frequency tag, where at least some of the vehicle information is embedded in a barcode 102. The barcode 102 may be scanned using a barcode reader 112 (shown in FIG. 1B) operatively connected to the mobile device 98. Details of the barcode reader 112, as well as other components/features of the mobile device 98 will be described below.

Some of the vehicle hardware 26 is generally shown in FIG. 1, including the telematics unit 14 and other components that are operatively connected to the telematics unit 14. Examples of other hardware 26 components include a microphone 28, speakers 30, 30' and buttons, knobs, switches, keyboards, and/or controls 32. Generally, these hardware 26 components enable a user to communicate with the telematics unit 14 and any other system 10 components in communication with the telematics unit 14. It is to be understood that the vehicle 12 may also include additional components suitable for use in, or in connection with, the telematics unit 14.

Operatively coupled to the telematics unit 14 is a network connection or vehicle bus 34, as mentioned above. Examples of suitable network connections include a controller area network (CAN), a media oriented system transfer (MOST), a local interconnection network (LIN), an Ethernet, and other appropriate connections, such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard vehicle dedicated communications device. In an example, the telematics unit 14 is linked to the telematics service center or call center via the carrier system 16, and is capable of calling and transmitting data to the telematics service center 24.

The telematics unit 14 provides a variety of services, both individually and through its communication with the telematics service center 24. The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, a short-range wireless communication network 48 (e.g., a BLUETOOTH® unit or a unit enabled with WiFi™), a dual antenna 50, and a short range wireless antenna 51. In one example, the wireless modem 42 includes a computer program and/or set of software routines (i.e., computer readable instructions embedded on a non-transitory, tangible medium) executing within processing device 36.

The short range wireless communication unit 48 may be used to connect the mobile communications device 98 with the telematics unit 14 (assuming that the device 98 is compatible with the vehicle 12) once the devices 14, 98 have been associated. In an example, when devices 14, 98 are associated by a BLUETOOTH® connection, the devices 14, 98 are referred to as being paired. In an example, the telematics unit 14 continuously monitors for the presence of the device 98 using a short range wireless antenna 51, and attempts to connect with the device 98 upon recognizing the presence of the device 98. In another example, the device 98 continuously monitors for the presence of the telematics unit 14 using its own short range wireless antenna 99. The device 98 attempts to connect with the telematics unit 14 upon recognizing the presence of the telematics unit 14; which typically occurs as soon as the device 98 is placed within the short range wireless range of the telematics unit 14. The device 98 or the telematics unit 14 alone may be configured to monitor for the presence of the other device, or both of the devices 14, 98 may be configured to monitor for the presence of the other device at the same time.

It is to be understood that the device 98 and the telematics unit 14 attempt to connect when within short range of one another after the devices 14, 98 have been associated (e.g., paired). The device 98 and the telematics unit 14 are actually associated (and authenticated) when the telematics unit 14 and the device 98 exchange security codes/passwords with each other. This enables the telematics unit 14 and the device 98 to communicate typically under a secured connection. As a more specific example, associating may involve setting the device 98 to a short range wireless discovery mode (such as by selecting, on the device 98, a discovery mode function as a menu option, icon, or the like). While in the discovery mode, other devices having a short range wireless communication system (such as the telematics unit 14) are allowed to detect the presence of the device 98. When the telematics unit 14 locates the device 98, the device 98 automatically provides the type of device it is (e.g., a cellular phone) and its short range wireless connection name. This short range wireless connection name may, for instance, be selected by the user or provided by the manufacturer of the device 98. The device 98 may then prompt the user to enter a security code/password, and this security code/password is sent to the telematics unit 14. Upon receiving the security code/password, the telematics unit 14 sends its own security code/password to the device 98 to ultimately associate the two devices 14, 98 together.

Once the two devices 14, 98 have been associated and whenever they are within short range wireless communication range of each other, the telematics unit 14 can directly communicate with the device 98, and voice communications received at the device 98 are transmitted to the user hands/free via the telematics unit 14.

The short range wireless communication unit 48 may also be configured with Wi-Fi™ connectivity, and may be used to establish a Wi-Fi™ connection between the telematics unit 14 and the mobile device 98 (again assuming that the device 98 is compatible with the vehicle 12). For instance, the telematics unit 14 that is enabled with Wi-Fi™ connectivity (i.e., through the short range wireless communication unit 48) may connect to a network resource such as the Internet through the mobile device 98 that is acting as a wireless network access point (i.e., a hotspot), or vice versa. The telematics unit 14 (or the device 98) may connect to the device 98 (or the telematics unit 14) when the two devices 14, 98 are within a preset wireless connection range of one another. In an example, the preset wireless connection range for Wi-Fi™ connectivity is a standard range of about 20 meters (i.e., about 65 feet indoors), and a larger range outdoors.

In some instances, connection between the mobile communications device 98 and the telematics unit 14 may be accomplished by a wired connection (assuming that the device 98 is compatible with the vehicle 12 via wired connections), such as by a universal serial bus (USB) connection. In these instances, the device 98 may be equipped with a USB connection port to which a USB cord is connected. Another USB connection port may be provided inside the vehicle 12, and is configured to receive an opposing end of the USB cord. The USB connection port inside the vehicle 12 may be connected directly to one or more vehicle systems, such as the audio component 60, the display 80, etc.

It is to be understood that the telematics unit 14 may be implemented without one or more of the above listed components (e.g., the real time clock 46), except in some examples disclosed herein, the telematics unit 14 includes the short range wireless network 48. It is to be further understood that telematics unit 14 may also include additional components and functionality as desired for a particular end use.

The electronic processing device 36 of the telematics unit 14 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor. The electronic processing device 36 (also referred to herein as a processor) may, for example, include software programs having computer readable code to initiate and/or perform various functions of the telematics unit 14. The computer readable codes of the software programs run by the processor 36 contain computer readable instructions embedded on a non-transitory, tangible computer readable medium.

Still referring to FIG. 1, the location detection chipset/component 44 may include a Global Position System (GPS) receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown). In an example, the location detection chipset/component 44 may provide then-current GPS location data of the vehicle 12, which may be transmitted to the telematics service center 24 as vehicle data in response to a request for such data.

The cellular chipset/component 40 may be an analog, digital, dual-mode, dual-band, multi-mode and/or multi-band cellular phone. Basically, the cellular chipset 40 is a semiconductor engine that enables the telematics unit 14 to connect with other devices (e.g., other mobile communications devices such as the user's mobile communications device 98) using some suitable type of wireless technology. The cellular chipset-component 40 uses one or more prescribed frequencies in the 800 MHz analog band or in the 800 MHz, 900 MHz, 1900 MHz and higher digital cellular bands. In some cases, the cellular chipset/component 40 may also use a frequency below 800 MHz, such as 700 MHz or lower. In yet other cases, the cellular chipset/component 40 may use a frequency above 2600 MHz. Any suitable protocol may be used, including digital transmission technologies, such as TDMA (time division multiple access), CDMA (code division multiple access), GSM (global system for mobile telecommunications), and LTE (long term evolution). In some instances, the protocol may be short range wireless communication technologies, such as BLUETOOTH®, dedicated short range communications (DSRC), or Wi-Fi™. In other instances, the protocol is Evolution Data Optimized (EVDO) Rev B (3G) or Long Term Evolution (LTE) (4G). In an example, the cellular chipset/component 40 may be used in addition to other components of the telematics unit 14 to establish communications between the vehicle 12 and another party.

Also associated with electronic processing device 36 is the previously mentioned real time clock (RTC) 46, which provides accurate date and time information to the telematics unit 14 hardware and software components that may require and/or request date and time information. In an example, the RTC 46 may provide date and time information periodically, such as, for example, every ten milliseconds.

The electronic memory 38 of the telematics unit 14 may be configured to store data associated with the various systems of the vehicle 12 (i.e., vehicle data), vehicle operations, vehicle user preferences and/or personal information, and the like.

The telematics unit 14 provides numerous services alone or in conjunction with the telematics service center 24 or a data center thereof, some of which may not be listed herein, and is configured to fulfill one or more user or subscriber requests. Several examples of these services include, but are not limited to: turn-by-turn directions and other navigation-related services provided in conjunction with the GPS based chipset/ component 44; airbag deployment notification and other emergency or roadside assistance-related services provided in connection with various crash and/or collision sensor interface modules 52 and sensors 54 located throughout the vehicle 12; and infotainment-related services where music, Web pages, movies, television programs, videogames and/or other content is downloaded by an infotainment center 56 operatively connected to the telematics unit 14 via vehicle bus 34 and audio bus 58. In one example, downloaded content is stored (e.g., in memory 38) for current or later playback.

Again, the above-listed services are by no means an exhaustive list of all the capabilities of telematics unit 14, but are simply an illustration of some of the services that the telematics unit 14 is capable of offering. It is to be understood that when these services are obtained from the telematics service center 24, the telematics unit 14 is considered to be operating in a telematics service mode.

Vehicle communications generally utilize radio transmissions to establish a voice channel with carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. In one example, an Evolution Data Optimized (EVDO) Rev B (3G) system (which offers a data rate of about 14.7 Mbit/s) or a Long Term Evolution (LTE) (4G) system (which offers a data rate of up to about 1 Gbit/s) may be used. These systems permit the transmission of both voice and data simultaneously. Generally, dual mode antenna 50 services the location detection chipset/component 44 and the cellular chipset/component 40.

The microphone 28 provides the user with a means for inputting verbal or other auditory commands, and can be equipped with an embedded voice processing unit utilizing human/machine interface (HMI) technology known in the art. Conversely, speaker(s) 30, 30' provide verbal output to the vehicle occupants and can be either a stand-alone speaker 30 specifically dedicated for use with the telematics unit 14 or can be part of a vehicle audio component 60, such as speaker 30'. In either event and as previously mentioned, microphone 28 and speaker(s) 30, 30' enable vehicle hardware 26 and the telematics service center 24 to communicate with the occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice communication with the telematics service center 24 (whether it be with a live advisor 62 or an automated call response system 62') to request services, to initiate a voice call to another mobile communications device, etc.

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system (e.g., speaker 30'), or may utilize speaker 30 via arbitration on vehicle bus 34 and/or audio bus 58. In an example, the audio component 60 may have a USB connection port connected thereto that is configured to receive a USB cord or wire that is connected to the user's mobile device 98. In this way, the device 98 is connected to the telematics unit 14 via a wire.

Still referring to FIG. 1, the vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66 are operatively connected to the vehicle bus 34. Example vehicle sensors 64 include, but are not limited to, gyroscopes, accelerometers, speed sensors, magnetometers, emission detection and/or control sensors, environmental detection sensors, and/or the like. One or more of the sensors 64 enumerated above may be used to obtain the vehicle data mentioned above. Example sensor interface modules 66 include powertrain control, climate control, body control, and/or the like.

The vehicle hardware 26 also includes the display 80, which may be operatively directly connected to or in communication with the telematics unit 14, or may be part of the audio component 60. The display 80 may be any human-machine interface (HMI) disposed within the vehicle 12 that includes audio, visual, haptic, etc. The display 80 may, in some instances, be controlled by or in network communication with the audio component 60, or may be independent of the audio component 60. Examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

As mentioned above, the system 10 includes the carrier/communication system 16. A portion of the carrier/communication system 16 may be a cellular telephone system or any other suitable wireless system that transmits signals between the vehicle hardware 26 and land network 22. According to an example, the wireless portion of the carrier/communication system 16 includes one or more cell towers 18, base stations 19 and/or mobile switching centers (MSCs) 20, as well as any other networking components required to connect the wireless portion of the system 16 with land network 22. It is to be understood that various cell tower/base station/MSC arrangements are possible and could be used with the wireless portion of the system 16. For example, a base station 19 and a cell tower 18 may be co-located at the same site or they could be remotely located, or a single base station 19 may be coupled to various cell towers 18, or various base stations 19 could be coupled with a single MSC 20. A speech codec or vocoder may also be incorporated in one or more of the base stations 19, but depending on the particular architecture of the wireless portion of the system 16, it could be incorporated within an MSC 20 or some other network components as well.

Land network 22 may be a conventional land-based telecommunications network that is connected to one or more landline telephones and connects the wireless portion of the carrier/communication network 16 to the telematics data center 100 and/or application center 24. For example, land network 22 may include a public switched telephone network (PSTN) and/or an Internet protocol (IP) network. It is to be understood that one or more segments of the land network 22 may be implemented in the form of a standard wired network, a fiber or other optical network, a cable network, other wireless networks, such as wireless local networks (WLANs) or networks providing broadband wireless access (BWA), or any combination thereof. Communications between the vehicle 12 and the component(s) of telematics service center 24, e.g., may be established through the land network 22.

The telematics service center 24 of the telematics service provider is designed to provide the vehicle hardware 26 with a number of different system back-end functions. According to the example shown in FIG. 1, the telematics service center 24 generally includes one or more switches 68, internal servers 70, databases 72, live and/or automated advisors 62, 62', processing equipment (or processor) 84, a communications module 86, as well as a variety of other telecommunication and computer equipment 74 that is known to those skilled in the art. These various telematics service provider components are coupled to one another by a network connection or bus 76, such as one similar to the vehicle bus 34 previously described in connection with the vehicle hardware 26.

The processor 84, which is often used in conjunction with the computer equipment 74, is generally capable of executing suitable software and/or programs enabling the processor 84 to accomplish a variety of telematics service center 24 functions. Further, the various operations of the telematics service center 24 are carried out by one or more computers (e.g., computer equipment 74, server(s) 70, etc.) programmed to carry out some of the tasks of the telematics service center 24. The computer equipment 74 (including computers) may include a network of internal servers (including server 70) coupled to both locally stored and remote databases (e.g., database 72) of any information processed.

Switch 68, which may be a private branch exchange (PBX) switch, routes incoming signals so that voice transmissions are usually sent to either the live advisor 62 or the automated response system 62', and data transmissions are passed on to a modem or other piece of equipment (not shown) for demodulation and further signal processing. The modem preferably includes an encoder, as previously explained, and can be connected to various devices such as the server 70 and database 72.

In an example, the telematics service center 24 further includes a data aggregator 88 which is embodied at the telematics service center 24 as a data aggregation module. The data aggregator 88 may be in selective and operative communication with the mobile communications device 98 through the communications system 16, and may, in some instances, receive and bin data received from the mobile communications device 98. The data aggregator 88 may otherwise be operatively connected to the communications module 86 at the telematics service center 24 (via, e.g., the bus 76), and may be configured to receive and bin data received from the mobile device 98 upon receiving it from the communications module 86. The data may be used by the processor 84 upon executing an application 122, which includes software/computer code for performing various steps of the examples of the method disclosed herein. In these instances, the data aggregator 88 may simply be a data repository. In other instances, the data aggregator 88 has its own processor, and is also capable of running the application 122.

In some examples of the method, the application 122 contains computer readable code for formulating an interoperability message. This message may be sent to the mobile device 98, by the communications module 86 at the telematics service center 24 using a wireless connection, a wired connection, the Internet, a short message service message, etc. In an example, the application 122 further includes suitable computer readable code for filtering the data contained in the message and/or for performing data conditioning processes to place the data contained in the message in a proper form for transmission to mobile device 98.

The communications module 86 at the telematics service center 24 is configured, via suitable communications equipment (such as equipment capable of handling messaging between the telematics service center 24 and the telematics unit 14 (e.g., switches, switchboards, etc.), modems (e.g., a wireless modem similar to modem 42), TCP/IP supporting equipment, and/or the like), to enable the telematics service center 24 to establish a communication with, for example, the mobile communications device 98, or vice versa. In an example, the communications module 86 may receive packet data from the mobile device 98, and the packet data may include, for instance, vehicle information and mobile device identification information. Upon receiving the packet data, the communications module 86 unpacketizes the data, and may identify that the data pertains to the interoperability verification method disclosed herein. In other examples, the communications module 86 may receive a text message from the device 98, where the text message includes the vehicle information and the device ID. The communications module 86 will then transmit the data to, e.g., the data aggregator 88. The data aggregator 88 (or the processor 84) may run computer readable code/software routines (e.g., the application 122) that are capable of receiving and processing the data to ultimately determine the interoperability between the device 98 and the vehicle 12.

The data aggregator 88 and the communications module 86 may be part of a server (e.g., server 70) located at or that is otherwise affiliated with the telematics service center 24. The components of the server receive information and process transmitted thereto from the mobile device during the examples of the method disclose.

The database(s) 72 at the telematics service center 24 may be designed to store subscriber profile records, subscriber behavioral patterns, or any other pertinent subscriber information. In an example, the database(s) 72 also has stored therein interoperability file(s) containing interoperability testing data for different combinations of mobile communications devices and vehicle types. In an example, the database 72 includes multiple interoperability files, each of which contains interoperability data for a particular mobile device and a particular vehicle. In another example, the database includes a single interoperability file for each vehicle, where the single file contains interoperability data for multiple mobile devices with the particular vehicle. As previously mentioned, the interoperability file(s) may be accessible online through the webpage 96. The data contained in the interoperability file(s) may include, e.g., at least an indication of whether or not an interoperability issue between a particular device and a particular vehicle type has previously been determined to exist. In some instances, the interoperability file(s) may also include additional data, such as the types of interoperability issues found to exist between a particular device and a particular vehicle type and/or instructions for how to render the device compatible with a particular vehicle type. The database may be queried, and the interoperability data may be used, e.g., by the data aggregator 88 (or by the processor 84) when assessing the interoperability of the mobile device 98 and the vehicle 12, when formulating a message for the device 98, etc.

In another example, at least one of the databases 72 is a structured query language (SQL) database, which is a database programmed for managing interoperability data in a relational database management system (RDBMS). This type of database 72 may be queried to obtain the interoperability data.

It is to be appreciated that the telematics service center 24 may be any central or remote facility, manned or unmanned, mobile or fixed, to or from which it is desirable to exchange voice and data communications. As such, the live advisor 62 may be physically present at the telematics service center 24 or may be located remote from the telematics service center 24 while communicating therethrough.

The telematics service center 24 components shown in FIG. 1 may also be virtualized and configured in a Cloud Computer, that is, in an Internet-based computing environment. For example, for the telematics service center 24, the computer equipment 74 may be accessed as a Cloud platform service, or PaaS (Platform as a Service), utilizing Cloud infrastructure rather than hosting computer equipment 74 at the telematics service center 24. The database 72 and internal server 70 may also be virtualized as a Cloud resource. The Cloud infrastructure, known as IaaS (Infrastructure as a Service), typically utilizes a platform virtualization environment as a service, which may include components such as the processor 84, database 72, server 70, and computer equipment 74. In an example, application software and services (such as, e.g., navigation route generation and subsequent delivery to the vehicle 12) may be performed in the Cloud via the SaaS (Software as a Service). Subscribers, in this fashion, may access software applications remotely via the Cloud. Further, subscriber service requests may be acted upon by the automated advisor 62', which may be configured as a service present in the Cloud.

The communications network provider 90 generally owns and/or operates the carrier/communication system 16. The communications network provider 90 includes a mobile network operator that monitors and maintains the operation of the communications network 90. The network operator directs and routes calls, and troubleshoots hardware (cables, routers, network switches, hubs, network adaptors), software, and transmission problems. It is to be understood that, although the communications network provider 90 may have back-end equipment, employees, etc. located at the telematics service center 24, the telematics service center 24 is a separate and distinct entity from the network provider 90. In an example, the equipment, employees, etc. of the communications network provider 90 are located remote from the telematics service center 24. The communications network provider 90 provides the user with telephone and/or Internet services, while the telematics service center 24 provides a variety of telematics-related services (such as, for example, those discussed hereinabove). The communications network provider 90 may interact with the telematics service center 24 to provide services (such as emergency services) to the user.

While not shown in FIG. 1, it is to be understood that in some instances, the telematics service provider operates a data center (which is similar to the telematics service center 24), which receives voice or data calls, analyzes the request associated with the voice or data call, and transfers the call to an application specific telematics service center associated with the telematics service provider. It is further to be understood that the application specific telematics service center may include all of the components of the data center, but is a dedicated facility for addressing specific requests, needs, etc. Examples of application specific telematics service centers include, but are not limited to, emergency services call centers, navigation route call centers, in-vehicle function call centers, or the like.

As previously mentioned, the system 10 utilizes the mobile device 98, which is in selective and operative communication with the telematics service center 24 via a wireless connection through the carrier/communication system 16. The device 98 shown in FIG. 1 will now be described in further detail in conjunction with FIG. 1B. The device 98 shown in FIG. 1B includes a touchscreen interface 104, which is a display upon which information (e.g., an interoperability message) may be presented. The touchscreen interface 104 is also configured, via suitable electrical components, to detect the presence and location of touch (e.g., by the user's fingers or a stylist) on the display area of the screen. In an example, the user may touch the touchscreen interface 104 to select an action associated with the message, e.g., to send a reply message to the telematics service center 24, to activate a hyperlink to view instructions for how to make the user's device 98 compatible with the vehicle 12, to close out the message, or the like.

The device 98 also includes a number of electronic components, all of which are operatively connected to an information bus 106. One of the electronic components includes a processor 108 which may be a microprocessor configured to run apps on the device 98, such as the application or app 110. The app 110 runs on the operating system of the mobile communications device 98, and the app 110 contains software code specifically designed to i) obtain vehicle information, and ii) transmit vehicle information and mobile device identification information to the telematics service center 24. In some instances, the app 110 may further include software code specifically designed to provide instructions to the user for how to obtain the vehicle information. In yet further instances, the app 110 may include software code specifically designed to present an interoperability message onto the display screen (e.g., the touchscreen 104) of the mobile device 98.

The processor 108 is also configured to run other software programs for performing various functions of the mobile device 98, as well as other apps downloaded to the device 98.

Other electronic components of the device 98 include a short range wireless connection unit 114 and a cellular chipset 116. The short range wireless connection unit 114 may be used to establish short range wireless connections (e.g., BLUETOOTH® connections, Wi-Fi™ connections, and/or connections established by some other related standard) between the device 98 and another device (e.g., the vehicle telematics unit 14). In an example, short range wireless connections may be established within a short range connection range of within 10 meters (e.g., within 33 feet).

The cellular chipset 116 may be used to establish wireless connections between the device 98 and another device (e.g., the communications module 86 at the telematics service center 24). At distances that are longer than the distances used for short range wireless connections, the cellular chipset 116 may be used to establish the wireless connection through the carrier/communication system 16. An example of when the cellular chipset 116 may be used include when the device 98 makes a packet data connection with the communications module 86 at the telematics service center 24. During such a connection, the device 98 can transmit vehicle information and mobile device identification information to the telematics service center 24 and/or to receive interoperability messages from the communications module 86.

In an example, the device 98 may include a radio frequency identification reader 112 (i.e., a barcode reader) and/or a camera 118. The barcode reader 112 is an electronic device designed for reading printed barcodes, such as the barcode 102 on the vehicle information tag 100 shown in FIG. 1A. The barcode 102 shown in FIG. 1A is a one-dimensional image including a linear display of lines having varying widths and spacings. The barcode may also be a two-dimensional image, which is often referred to as a matrix barcode, and this type of barcode may include a pattern of black modules (or square dots) arranged in a square pattern on a white background. These types of barcodes may be referred to as a quick response (QR) codes.

The barcode reader 112 may be similar to a flatbed scanner, and it contains a light source, a lens, and a light sensor for translating optical impulses into electrical impulses. The barcode reader 112 further contains decoder circuitry that analyzes barcode image data obtained from the barcode 102 by the light sensor. In one example, the barcode scanner 112 may be designed as a pen reader, which includes the light source placed next to a photodiode at the tip of a pen or wand connected to the mobile device 98. The barcode 102 is read by moving the tip of the pen or wand across the barcode 102. The photodiode measures the intensity of the light reflected back from the light source as the tip of the pen or wand crosses each bar and space of the barcode 102. The photodiode generates a waveform that is used to measure the widths of the bars and spaces in the barcode 102, where dark bars absorb light and white spaces reflect light so that the waveform generated by the photodiode represents the bar and space pattern in the barcode 102. The waveform is then decoded by the reader 112.

In another example, the barcode reader 112 may be a laser scanner, where a laser beam is used as the light source and a mirror or prism is used to scan the laser beam across the barcode 102. A photodiode is used to measure the intensity of the light reflected back from the barcode 102, and the measurements are then decoded by the reader 112.

The barcode reader 112 may, in yet another example, be a camera-based reader. In this example, the barcode reader 112 may be part of, or separate from the mobile device camera 118. The camera-based barcode reader utilizes image processing techniques to decode the barcode 102. For instance, a camera may include a charge-coupled device (CCD) that includes a number of rows of light sensors arranged in a 2-dimensional array. The reader 112 may obtain a voltage pattern from the light sensors that is identical to the pattern in the barcode 102 by sequentially measuring the voltages across each light sensor in each row of sensors.

The camera 118 of the mobile device 98 may be any imaging device embodied as part of the mobile device 98. The camera 118 may include its own memory or may utilize the mobile device memory in order to record and store images. The images may include photographs and/or moving images, such as a video. The camera 118 may be designed as a digital camera modified for use in the mobile device 98. For instance, the camera 118 may be a digital imaging device that utilizes CMOS imaging sensors. In an example, the camera 118 may be designed to capture an image or photograph of the vehicle identification tag 100 displayed on the vehicle 12 shown in FIG. 1A. The vehicle information may then be extracted from the image by the app 110 run by the processor 108 of the mobile device 98 or by the app 122 run by the data aggregator 88 or the processor 84 at the telematics service center 24. The vehicle information may be used by the app 122 at the telematics service center 24 to assess the interoperability of the device 98 with the vehicle 12.

In yet another example, the mobile device 98 may include a microphone 120 to provide the user with a means for inputting verbal or other auditory commands into the mobile device 98 (e.g., the user may recite the contents of the vehicle identification tag 100 into the microphone 120). The microphone 120 may be equipped with an embedded voice processing unit utilizing human/machine interface (HMI) technology. The microphone 120 may, for example, be set up or otherwise configured similar to the microphone 28 of the vehicle 12, except that the microphone 120 is designed to be embodied in and/or as part of the mobile device 98.

In an example, the mobile device 98 may include a user interface other than a touchscreen, such as a display screen upon which information may be presented, and a keypad to input commands, etc. into the device 98. In an example, the user may input the contents of the vehicle information tag 100 into the device 98 by pressing appropriate keys on the keypad.

Figure 1B:
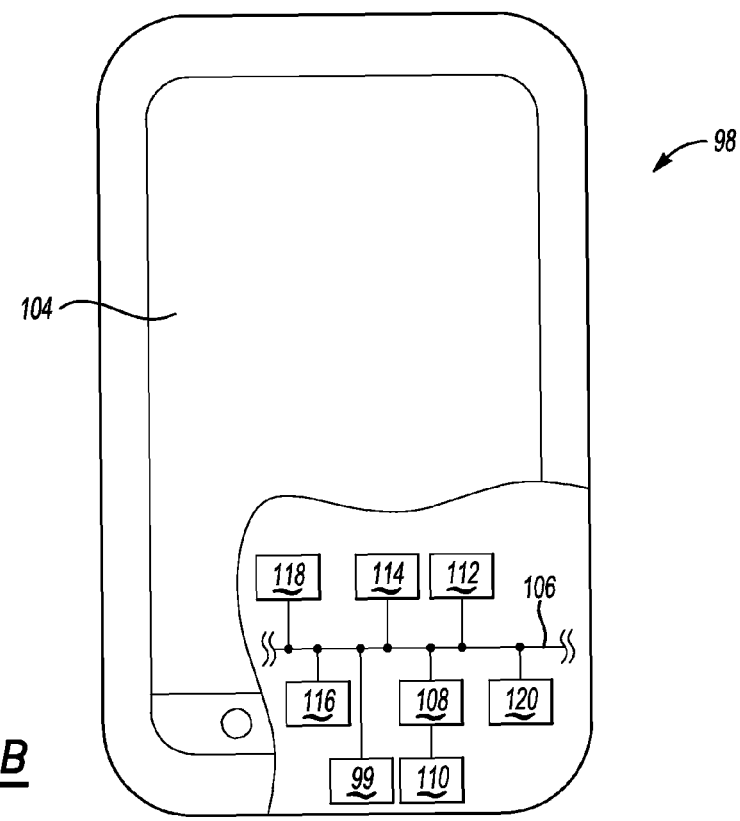
FIG. 1B semi-schematically depicts an example of a mobile communications device.
Figure 4:
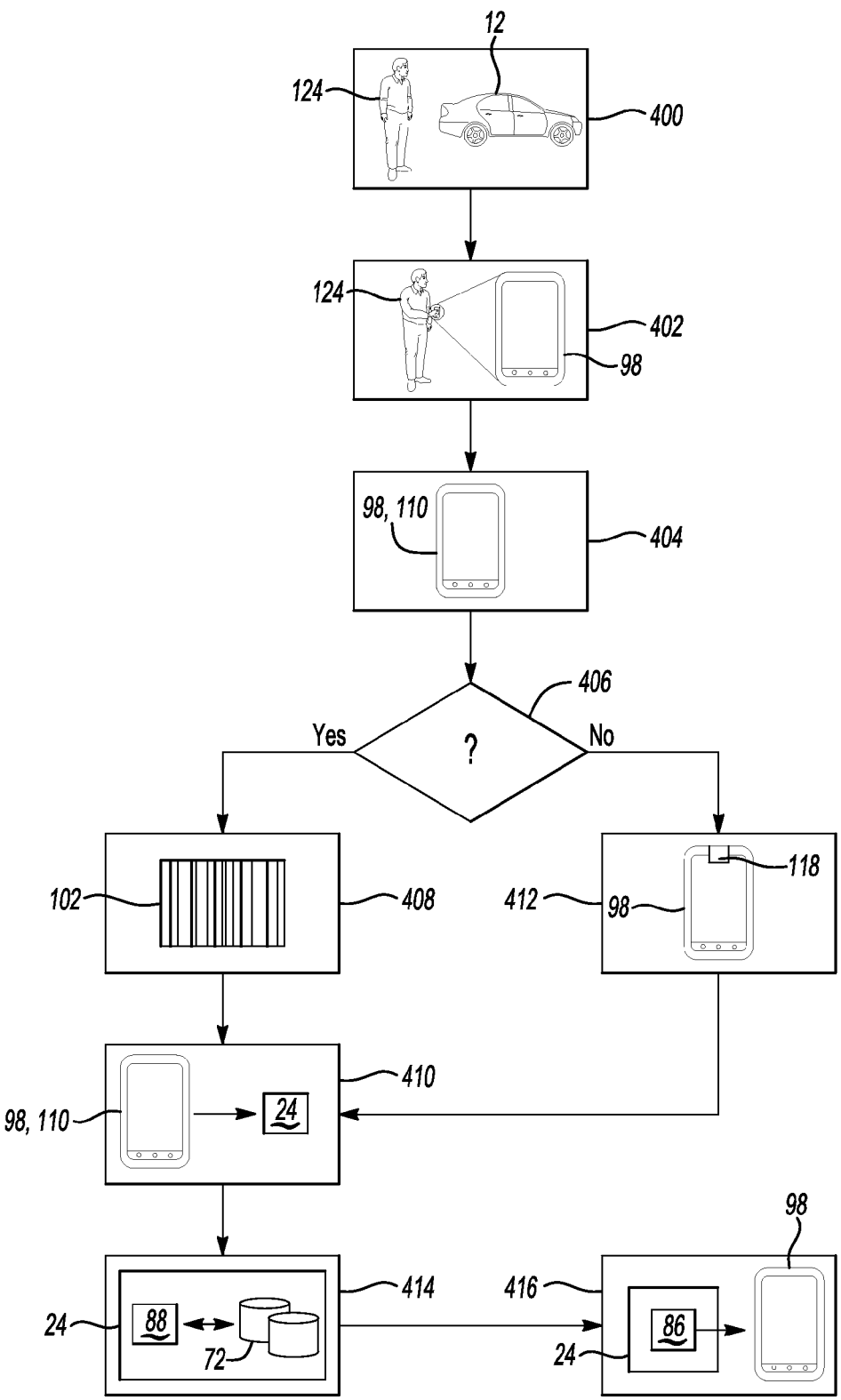
FIG. 4 is a flow diagram depicting a specific example of a device-vehicle interoperability verification method.

Examples of a device-vehicle interoperability verification method will now be described herein in conjunction with FIGS. 2-4, and these methods will be described utilizing the system 10 described above in conjunction with FIG. 1 which utilizes the components described in conjunction with FIGS. 1A and 1B.

In some examples of the method, the user is a customer and, the user wishes to determine if there are any interoperability issues between his/her mobile device 98 and the prospective vehicle 12. This scenario may arise, e.g., when the user is browsing through a vehicle dealership, and locates a particular vehicle 12 that he/she is interested in purchasing. Typically, the prospective vehicle 12 has displayed thereon the vehicle identification tag 100 as shown in FIG. 1A. Information may be obtained from the vehicle tag 100 by the user's device 98 and may be utilized in the device-vehicle interoperability verification method.

Referring to the example of the method shown in FIG. 2, at step 200, vehicle information of the vehicle 12 is obtained by the mobile device 98. In the instant example, the vehicle information pertains to a prospective vehicle; i.e., a vehicle within which the device 98 may, or is going to be used. As previously stated, the vehicle information is obtained from the vehicle identification tag 100 associated with the vehicle 12.

In one example, the vehicle identification tag 100 includes the vehicle information in the form of human readable text. Utilizing the mobile device camera 118, the user may capture a digital image (e.g., a digital photograph or digital video) of the vehicle identification tag 100. This may be accomplished, by the user, by aiming the device camera 118 at the tag 100 and then pressing an appropriate function key/icon, e.g., on the touchscreen 104 to capture the digital image. The vehicle information may be extracted from the digital image utilizing optical character recognition software, which in one example, is part of the app 110 that is resident on the mobile device 98. Optical character recognition (OCR) software includes computer readable code for electronically converting digital images into machine-encoded text. In this example, the processor 108 may packetize the machine-encoded text of the digital image of the vehicle tag 100 captured by the camera 118 for transmission to the telematics service center 24. The processor 108 may, in another example, format the machine-encoded text of the digital image of the vehicle 100 in the form of a text message for transmission to the telematics service center 24 (e.g., to the communications module 86 of the telematics service center server).

Where the vehicle identification tag 100 includes the vehicle information in the form of human readable text, the vehicle information may otherwise be obtained by the device 98 by inputting the vehicle information utilizing one of the user interfaces of the device 98. In an example, the user may read the vehicle information from the vehicle tag 100 displayed on the vehicle 12, and then manually input the vehicle information into the device 98. Inputting may be accomplished by verbally reciting the vehicle information into the microphone 120. In this case, the processor 108 may include speech-to-text conversion software, and may utilize this software to convert the verbal recitations into text. The processor 108, running other software code, may then packetize the text converted from the verbal recitations, or format the converted text into a text message for transmission to the telematics service center 24 (e.g., to the communications module 86 of the telematics service center server).

Manual inputting of the vehicle information may otherwise be accomplished by typing the information obtained from the vehicle tag 100 into the device 98 utilizing the touchscreen 104 or the keypad of the device 98. The inputted information, which is already in the form of text, is then packetized or formatted into a text message by the processor 108 for transmission of the vehicle information to the telematics service center 24 (e.g., to the communications module 86 of the telematics service center server).

In another example, the vehicle information tag 100 may include the barcode 102 (shown in FIG. 1A), again which contains the information pertaining to the vehicle 12. In instances where the device 98 includes the barcode reader 112, the user may utilize the barcode reader 112 to scan the barcode 102 on the vehicle tag 100. The processor 108, running appropriate software code, converts the barcode patterns into machine-encoded text, and then packetizes the converted patterns (which are now text), or formats the converted patterns into a text message for transmission to the telematics service center 24 (e.g., to the communications module 86 of the telematics service center server).

At step 200 of FIG. 2, the mobile device 98 also retrieves mobile communications device identification information stored, e.g., in an electronic memory (not shown) of the device 98. The mobile communications device identification information (referred to herein below as the "device ID") may include the manufacturer name and model of the device 98, as well as a firmware version of the device 98 (e.g., the version of the programs and/or data structures used to internally control the mobile device 98). It is believed that the manufacturer name, model, and firmware version is enough information to enable the data aggregator 88 (or the processor 84) at the telematics service center 24 to identify the mobile device 98 type.

Utilizing a wireless connection with the communications module 86 at the telematics service center 24 established by the cellular chipset 116, in this example, the mobile device 98 transmits i) the vehicle information obtained from the vehicle tag 100 and ii) the device ID retrieved from the device 98 to the telematics service center 24. This step occurs at 202 in FIG. 2. The vehicle information and the device ID may be transmitted as packet data or packet-switched data, where the data is split up into smaller pieces referred to as packets. Transmission of the packet data may utilize single-carrier radio transmission technology (i.e., 1xRTT), which is a family member of a CDMA2000 single wireless standard that supports data transmission speeds up to about 144 kBps. The packet data may otherwise be transmitted using another suitable protocol, such as a digital transmission technology, e.g., GSM (global system for mobile telecommunications) or some other suitable type of wireless transmission technology. In the form of packets, the data may be easily transmitted using various transmission technologies such as the Internet or via a cellular network.

In another example, the app 110 may include software code for formulating the vehicle information and the device ID into a short message service (SMS) format. In this format, and as previously mentioned, the device 98 may be configured (e.g., by the app 110) to automatically transmit the information as a text message to the telematics service center 24.

It is to be understood that the transmission of the vehicle information and the device ID is performed by the device 98 in response to a command generated by the app 110 resident on the device 98 upon obtaining the vehicle information and upon retrieving the device ID. It is also to be understood that the transmission of the vehicle information and the device ID occurs over a secure connection that will perform authentication and/or encryption of the transmitted data.

The data transmitted to the telematics service center 24 is received by the communications module 86, which unpacketizes the data (if the data is packetized) and identifies the data as data for use in verifying the interoperability between the device 98 and the prospective vehicle 12. The communications module 86 forwards the data to the data aggregator 88, which then queries the database(s) 72 for interoperability data (which, e.g., may be stored in one or more interoperability files stored in the database 72). The interoperability data pertains to an interoperability between the device 98 and the vehicle 12. For example, querying the database may result in the retrieval of an interoperability file that contains data pertaining to the interoperability between the type of mobile device 98 (which is identified by the device ID) and the type of the vehicle 12 (which is identified by the vehicle information). In another example, and as previously mentioned, at least one of the databases 72 is a SQL database, and the interoperability data may be stored in this SQL database. In this example, the data aggregator 88 will query the SQL database to obtain the data pertaining to the interoperability between the mobile device 98 and the vehicle 12. As previously described, the data contained in and obtained from the database(s) 72 was previously determined from interoperability tests performed on the device type with the vehicle type. The querying of the database(s) 72 (e.g., the SQL database) occurs at step 204 in FIG. 2.

Upon receiving the interoperability data, the data aggregator 88 (or the processor 84 in instances where the data aggregator 88 is a data repository) running the app 122 processes the interoperability data to determine that i) the mobile device 98 is compatible with the vehicle 12 or ii) the mobile device 98 is not compatible with the vehicle 12, or iii) the mobile device 98 is partially compatible with the vehicle 12. For example, the mobile device 98 may be a smartphone type A and the vehicle 12 may be a vehicle type B, and the interoperability data may reveal that the smartphone type A is fully compatible with the vehicle type B. In another example, the mobile device 98 may be a tablet computer C and the vehicle 12 may be the vehicle type B, and the interoperability data may reveal that the tablet computer C is not at all compatible with the vehicle type B.

When the device 98 is partially compatible with the vehicle 12, certain features of the mobile device 98 may be compatible with the vehicle 12 type, while other features of the device 98 are not compatible with the vehicle 12 type. For instance, the smartphone type A may be able to establish short range wireless connections with an in-vehicle device of the vehicle type B, but cannot establish a connection with the audio component of the vehicle type B, e.g., to play mp3's from the device 98 through the in-vehicle audio component. This compatibility determination may be rendered during the processing of the interoperability data by the app 122 run by data aggregator 88 (or the processor 84).

A specific example of the how the interoperability data is processed by the telematics service center 24 to determine the interoperability between the mobile device 98 and the vehicle 12 will now be described herein. This example utilizes the application (or app) 122 at the telematics service center 24. The instant example of how the interoperability data is processed at the telematics service center 24 will be described hereinbelow in conjunction with FIG. 3.

At step 300, the app 110 resident on the mobile device 98 commands the device 98 to transmit i) the vehicle information (which may include the vehicle information itself, or an image of the vehicle identification tag 100 containing such information) and ii) the device ID to the telematics service center 24. Upon receiving the transmission, the communications module 86 at the telematics service center 24 unpacketizes the data (if the data is packetized) included in the transmission and forwards the data to the data aggregator 88. If the data is not packetized, upon receiving the transmission, the communications module 86 will forward the data directly to the data aggregator 88 without having to unpacketize it.

At step 302, the data aggregator 88 analyzes the data to determine whether or not the data includes an image of the vehicle identification tag 100. However, in instances where the data aggregator 88 is a data repository, the data aggregator 88 will forward the data to the processor 84, and the processor 84 will then determine if the data includes an image of the vehicle identification tag 100. If an image of the tag 100 is present, then at step 304, the app 122 utilizes OCR software code to extract the vehicle information (e.g., make, model, year, etc.) from the image. In instances where the image of the tag 100 includes the barcode 102, the app 122 will then utilize barcode reading software to retrieve the vehicle information from the barcode 102.

Utilizing the vehicle information extracted from the image of the tag 100 and the device ID received from the mobile device 98, the app 122 queries the database(s) 72 (e.g., the SQL database) for interoperability data (which may or may not be contained in a file) pertaining to the mobile device 98 type and the vehicle 12 type. This step occurs at 306 in FIG. 3.

Referring back to step 302, the app 110 resident on the device 98 may otherwise obtain the vehicle information from the vehicle tag 100 itself, e.g., by extracting the information from the image of the vehicle tag 100, reading the barcode 102 from the tag 100, etc. In this case, the mobile device 98 sends the vehicle information to the telematics service center 24 rather than sending the image of the tag 100. Thus, at step 302, the app 122 will determine that an image of the tag 100 was not sent, and the method then moves directly to step 306 where the app 122 queries the database 72 to obtain the interoperability data as described above.

At step 308, the app 122 utilizes the interoperability data to determine whether or not the mobile device 98 and the vehicle 12 are compatible. If the app 122 determines that the device 98 and the vehicle 12 are not compatible, the method moves to step 310 where the app 122 queries the database 72 again for any detailed user instructions or suggestions that may be provided to the user to correct any incompatibilities between the user's mobile device 98 and the vehicle 12. These instructions/suggestions may be included in a message to be sent to the device 98, and this process will be described in conjunction with step 206 in FIG. 2. In short, at step 206 of FIG. 2, the app 122 formulates the message, which is then forwarded to the communications module 86 for transmission to the device 98. Details of step 206 of FIG. 2 will be described below.

Referring back to step 308 of FIG. 3, if the app 122 determines that the device 98 and the vehicle 12 are fully compatible, then the method moves directly to step 206 of FIG. 2. Again, at step 206, a message is formulated, and the communications module 86 transmits the message to the device 98 indicating that the device 98 is compatible with the vehicle 12.

Referring back to FIG. 2, at step 206, the app 122 formulates the message utilizing the processed interoperability data, and as stated above, this message is sent to the mobile device 98. In an example, when the data aggregator 88 (or the processor 84) determines that the type of the mobile device 98 is fully compatible with the type of vehicle 12, the message may be formulated to include a statement stating that the mobile device 98 is compatible with the vehicle 12. An example of the statement may be something similar to "the phone and the car are compatible." Likewise, when the data aggregator 88 (or the processor 84) determines that the type of the mobile device 98 is not compatible with the type of vehicle 12, the message may be formulated to include a statement stating that the mobile device 98 is not compatible with the vehicle 12. An example of the statement may be something similar to "the phone and the car are incompatible."

In an example, a single message may be formulated and then sent to the device 98 from the telematics service center 24 at step 206. This single message may contain the statement indicating that the device 98 is or is not compatible with the vehicle 12 as described above. In instances where the device 98 is not compatible with the vehicle 12 or is partially compatible with the vehicle 12, the message may also contain a suggestion for how to correct the incompatibility issue(s) of the device 98 and the vehicle 12. In one example, the suggestion may include instructions for how to correct the incompatibilities. In another example, the suggestion may include a statement that instructions to correct the incompatibilities exist, and an inquiry asking the user whether he/she would like those instructions sent to his/her device 98. The user may respond to the inquiry by replying to message using his/her device 98. Upon receiving the reply, the app 122 may formulate a second message to be sent to the device 98, and this second message may include the instructions to correct the incompatibilities.

In another example, the suggestion included in the message may include a directive for the user to access the webpage 96 to obtain the instructions to correct the incompatibilities. In some cases, the instruction may also include a hyperlink that, upon selecting the hyperlink using the touchscreen 104 of the device 98, the user will be taken directly to the webpage 96 so that the user can obtain the instructions right away. The user may otherwise obtain the instructions from another computing device having Internet access, such as his/her personal computer, tablet computer, or the like.

In yet another example, the message may contain a statement that at least one feature of the device 98 is compatible with the vehicle 12, while at least one other feature of the device 98 is not compatible with the vehicle 12. An example of such a method may be something similar to "short range wireless connections may be established in the car, but mp3 player of the phone will not work."

It is to be understood that the instructions provided to the user by the telematics service center 24, or retrievable by the user from the webpage 96 may be used to correct the incompatibilities of the device 98 so that the device 98 may become fully compatible with vehicle 12. It is believed that the notification that the device 98 is incompatible or partially compatible with a prospective vehicle, and subsequent instructions for correcting the incompatibilities, may be helpful for the user when deciding whether or not to purchase the prospective vehicle 12. By providing the instructions to the user directly, or directing the user to look up the instructions on the webpage 96, the user may be apprised of the fact that the device 98 may be usable in the vehicle 12 by correcting one or more of the incompatibilities of the device 98 with the vehicle 12.

Still with reference to step 206 in FIG. 2, the message may be formulated by the app 122 (which is run by the data aggregator 88 or the processor 84) to include a text-based statement regarding the compatibility, non-compatibility, or partial compatibility of the mobile device 98 and the vehicle 12. The message may also include graphics in addition to the text. Further, the message may be formulated utilizing default settings for the message, e.g., a default font size, a default arrangement of the text (and graphics), etc. In some instances, the data aggregator 88 (or the processor 84) may ignore some or all of the default settings, and may formulate the message based on user-selected settings indicating how the message is to be formulated. For instance, the user may have selected to send messages in Arial font, and the message may therefore be formulated to include text in Arial font rather than in the default Times New Roman font. The user-selected settings may be retrieved, by the aggregator 88 or the processor 84, from a user profile stored in one of the databases 72.

Once the message is formulated, the message is forwarded to the communications module 86 which then establishes a wireless connection with the mobile device 98 utilizing the carrier/communication system 16. In one example, the communications module 86 packetizes the message, and at step 206, sends the message to the device 98 as packetized data. Upon receiving the message, the app 110 unpacketizes the data, and then displays the message on the touchscreen 104 (or other type of display screen). In another example, the message may be transmitted from the communications module 86 to the device 98 as non-packetized data, such as in the form of a text message. When the text message is received at the mobile device 98, the app 110 intercepts the text message, extracts the information contained in the text message, and then displays the information on the touchscreen 104 for the user. It is believed that the user may use the interoperability information contained in the message to identify a vehicle that is interoperable with or that can become interoperable with his/her mobile device 98. It is further believed that if a particular vehicle does not meet the needs of the user, the interoperability information contained in the message may also be used to provide suggestions of other suitable vehicles and/or solutions for how to make the current vehicle more compatible for the user.

A specific example of the method that may be applied when the user is browsing through a vehicle dealership, and locates a particular vehicle 12 that he/she is interested in purchasing will now be described in conjunction with FIG. 4. The user (identified in FIG. 4 by reference numeral 124) visits a vehicle dealership, at which the user 124 selects a prospective vehicle 12 for purchase. This step is shown at 400 in FIG. 4. Then, the user 124 may consult with one of the salespersons at the dealership and express his/her interest in purchasing the vehicle 12. The salesperson then may verbally instruct the user 124 to download the app 110 to his/her mobile device 98, e.g., from a server of the telematics service provider, from an online application store, or the like. In another scenario, at step 402, instructions to download the app 110 may be presented on the vehicle identification tag 100 attached to the vehicle 12. The user 124 may then download the app 110 upon reading the instructions without having to consult with a salesperson. The downloading of the app 110 is illustrated generally at step 402.

Once the app 110 is downloaded to the user's device 98, the user 124 initiates the app 110 which then determines the device ID (e.g., the device manufacturer and model, the firmware version of the device, etc.). This occurs at step 404 in FIG. 4. Then, while standing near the vehicle 12, the user 124 holds his/her device 98 up to the vehicle identification tag 100 that is attached to the vehicle 12 (e.g., on the vehicle driver-side window) and the app 110 determines whether or not the tag 100 includes a barcode 102. This determination step occurs at 406 in FIG. 4, and the determination may be accomplished by the app 110 commanding the barcode reader 112 of the device 98 to scan the vehicle tag 100. If a barcode 102 is found during the scan, then the app 110 determines that the vehicle tag 100 includes a barcode 102. At step 408, barcode scanner 112 reads the barcode 102 on the tag 100, and the app 110 extracts the pertinent vehicle information (e.g., make, model, and year of the vehicle 12) from the barcode 102. Then, at step 410, the device ID and the vehicle information is formatted for transmission, and transmitted from the device 98 to the telematics service center 24.

Referring back to step 406, if the app 110 determines that the vehicle tag 100 does not include a barcode 102, then the process moves to step 412 where the app 110 instructs the user to capture an image of the vehicle tag 100 utilizing the mobile device camera 118. For instance, the app 110 may formulate and display a message on the touchscreen 104 for the user 124, where such message provides an instruction for the user to capture the image. The message may state something similar to "Take a picture of the vehicle identification tag." In response thereto, the user 124 aims the camera 118 of the device 98 at the vehicle tag 100 and then captures a photograph of the tag 100. In one example, the app 110 extracts the vehicle information from the photograph captured by the device 98 utilizing the OCR software, and transmits the extracted vehicle information and the device ID to the telematics service center 24. In another example, the app 110 transmits the device ID and the photograph of the tag 100 to the telematics service center 24, and the data aggregator 88 (or the processor 84) running the app 122 extracts the vehicle information from the photograph utilizing its own OCR software. Transmission of the vehicle information (either as itself or as the photograph) and the device ID to the telematics service center 24 occurs at step 410 in FIG. 4.

Upon receiving the vehicle information and the device ID, the data aggregator 88 (or the processor 84) retrieves interoperability data from the database 72 as shown at step 414, and the data aggregator 88 (or the processor 84) formulates an interoperability message for the device 98. At step 416, the communications module 86 at the telematics service center 24 sends the interoperability message to the device 98. Steps 414 and 416 may be performed in the same manner as described above for steps 204 and 206, respectively.

Another example of the method may involve the user attempting to use a new mobile device 98 in his/her existing vehicle 12. This example of the method follows the same process as described above in conjunction with FIG. 2; however the vehicle 12 may not contain a vehicle identification tag 100. In this case, the user may retrieve the vehicle identification information from, e.g., the vehicle manual, the vehicle title, or some other document and recite such information into the microphone 120 of the device 98 or type such information into the keypad of the device 98. In instances where the user has kept the vehicle identification tag (e.g., the user may have stored the tag in the glove compartment of the vehicle 12 after purchasing the vehicle 12), the user may capture an image of the tag 100 using the device camera 118 or may scan the barcode 102 (if one exists on the tag 100).

In instances where the device 98 already has the app 110 downloaded thereto, the app 110 will send the vehicle identification information (input by the user, or extracted from the image of the tag 100 or the barcode 102) along with the device ID to the telematics service center 24. In instances where the device 98 does not have the app 110, the user may first download the app 110, e.g., from an application store, and then use the app 110 to send the vehicle identification information and the device ID to the telematics service center 24.

The interoperability verification method will then be applied as previously described to determine if the user's new mobile device 98 is compatible with the user's existing vehicle 12. A message will be formulated and sent to the user's new device 98, where such message includes a statement that the new device 98 is compatible, is not compatible, or is partially compatible with the user's existing vehicle 12. The message may also include a suggestion for how to render the new device 98 compatible if the app 122 determined that the device 98 is not compatible, etc., as also described above in conjunction with FIGS. 2 and 3.

The examples of the method have been described above utilizing a mobile communications device 98 that is capable of storing and running apps, e.g., the app 110. It is envisioned that the examples of the method may be modified so that a cellular phone or other device not capable of storing and running apps may be used. In one way, the user may send a text message (e.g., an SMS message) to the telematics service center 24. The user may retrieve the vehicle identification information read from the vehicle identification tag 100, and input such information into the text message. The user may also input the device ID assuming that the user knows the manufacturer name and model (e.g., the model number) of the device 98, as well as its firmware version. The text message will be received by the communications module 86 at the telematics service center 24, where the data aggregator 88 will determine the interoperability of the device 98 with the vehicle 12. The interoperability message may be sent to the user's cellular phone also by text messaging, and the user may open the text message to read the content contained in the interoperability message.

While several examples have been described in detail, it will be apparent to those skilled in the art that the disclosed examples may be modified. Therefore, the foregoing description is to be considered non-limiting.

The invention claimed is:

1. A device-vehicle interoperability verification method, comprising:
    obtaining vehicle information by a mobile communications device, the vehicle information pertaining to a vehicle within which the mobile communications device is being used or is going to be used;
    transmitting i) the vehicle information and ii) mobile communications device identification information from the mobile communications device to a server, the transmitting occurring in response to a command generated by an application resident on the device, the application including computer readable code, embedded on a tangible, non-transitory computer readable medium, for performing the transmitting;
    by a data aggregator at the server, querying a database to obtain data pertaining to an interoperability between the mobile communications device and the vehicle, the interoperability including an ability of any of a feature or a function of the mobile communications device to work when i) used in the vehicle, ii) connected to the vehicle, or iii) both used in and connected to the vehicle; and
    sending a message to the mobile communications device by a communications module at the server, the message including at least the data pertaining to the interoperability between the mobile communications device and the vehicle.

2. The method as defined in claim 1 wherein the obtaining of the vehicle information is accomplished using a vehicle identification tag associated with the vehicle.

3. The method as defined in claim 2 wherein the obtaining is accomplished by:
    receiving a digital image of the vehicle identification tag taken with a camera operatively associated with the mobile communications device; and
    via the application resident on the mobile communications device running optical character recognition software, extracting the vehicle information from the digital image.

4. The method as defined in claim 2 wherein the obtaining is accomplished by reading the vehicle identification tag using a radio frequency identification bar code reader that is operatively associated with the mobile communications device.

5. The method as defined in claim 1 wherein the vehicle information includes a year, a make, and a model of the vehicle, and wherein the mobile communications device identification information includes a manufacturer name, a model, and a firmware version of the mobile communications device.

6. The method as defined in claim 1 wherein the obtaining of the vehicle information is accomplished by receiving vehicle information that is manually input into the mobile communications device.

7. A device-vehicle interoperability verification method, comprising:
    obtaining vehicle information by a mobile communications device, the vehicle information pertaining to a vehicle within which the mobile communications device is being used or is going to be used;
    transmitting i) the vehicle information and ii) mobile communications device identification information from the mobile communications device to a server, the transmitting occurring in response to a command generated by an application resident on the device, the application including computer readable code, embedded on a tangible, non-transitory computer readable medium, for performing the transmitting;
    by a data aggregator at the server, querying a database to obtain data pertaining to an interoperability between the mobile communications device and the vehicle;
    by the data aggregator or a processor operatively associated with the data aggregator, processing the data obtained during the querying of the database;
    from the processing, determining that i) the mobile communications device is compatible with the vehicle or ii) the mobile communications device is not compatible with the vehicle; and
    sending a message to the mobile communications device by a communications module at the server, the message including at least the data pertaining to the interoperability between the mobile communications device and the vehicle.

8. The method as defined in claim 7 wherein the mobile communications device is determined to be compatible with the vehicle, and wherein the data pertaining to the interoperability included in the message includes a statement that the mobile communications device is compatible with the vehicle.

9. The method as defined in claim 7 wherein the mobile communications device is determined not to be compatible with the vehicle, and wherein the method further comprises:
by the data aggregator, obtaining additional data pertaining to the interoperability from one of an interoperability file found in the database, or from a structured query language (SQL) database, the additional data including a suggestion for how to make the mobile communications device compatible with the vehicle or a suggestion of another vehicle that the mobile communications device is compatible with; and
including the additional data in the message to be sent to the mobile communications device.

10. A device-vehicle interoperability verification method, comprising:
obtaining vehicle information by a mobile communications device, the vehicle information pertaining to a vehicle within which the mobile communications device is being used or is going to be used;
transmitting i) the vehicle information and ii) mobile communications device identification information from the mobile communications device to a server, the transmitting occurring in response to a command generated by an application resident on the device, the application including computer readable code, embedded on a tangible, non-transitory computer readable medium, for performing the transmitting;
by a data aggregator at the server, querying a database to obtain data pertaining to an interoperability between the mobile communications device and the vehicle; and
by the data aggregator or a processor operatively associated with the data aggregator, processing the data obtained during the querying of the database;
from the processing, determining that at least one feature of the mobile communications device is compatible with the vehicle while at least one other feature of the mobile communications device is not compatible with the vehicle; and
sending a message to the mobile communications device by a communications module at the server, the message including at least the data pertaining to the interoperability between the mobile communications device and the vehicle;
wherein the data pertaining to the interoperability included in the message includes a statement that the least one feature of the mobile communications device is compatible with the vehicle and the at least one other feature of the mobile communications device is not compatible with the vehicle.

11. A device-vehicle interoperability verification method, comprising:
via a user, selecting a prospective vehicle for purchase;
executing an application on a mobile communications device of the user, the application including computer readable code embedded on a tangible, non-transitory computer readable medium for determining mobile communications device identification information; and
one of:
when the prospective vehicle has a radio frequency identification tag associated therewith, i) by the application, reading vehicle information from the radio frequency identification tag, ii) transmitting the mobile communications device identification information and the vehicle information to a server, and iii) determining, by a data aggregator at the server, an interoperability between the mobile communications device and the vehicle from the mobile communications device identification information and the vehicle information, the interoperability including an ability of any of a feature or a function of the mobile communications device to work when i) used in the vehicle, ii) connected to the vehicle, or iii) both used in and connected to the vehicle; or
when the prospective vehicle does not have a radio frequency identification tag associated therewith, i) by the application, instructing the user to capture a digital image of a vehicle identification tag associated with the vehicle using a camera operatively associated with the mobile communications device, ii) via the application, extracting the vehicle information from the digital image of the vehicle identification tag, iii) transmitting the mobile communications device identification information and the vehicle information to the server, and iv) determining, by the data aggregator at the server, the interoperability between the mobile communications device and the vehicle from the mobile communications device identification information and the vehicle information, the interoperability including an ability of any of a feature or a function of the mobile communications device to work when i) used in the vehicle, ii) connected to the vehicle, or iii) both used in and connected to the vehicle.

12. The method as defined in claim 11 wherein the determining of the interoperability between the mobile communications device and the prospective vehicle is accomplished by the data aggregator at the server by querying i) a database to obtain an interoperability file containing data pertaining to the interoperability between the mobile communications device and the vehicle or ii) a structured query language (SQL) database for data pertaining to the interoperability between the mobile communications device and the vehicle.

13. The method as defined in claim 12 wherein after the interoperability is determined, the method further comprises sending a message to the mobile communications device by a communications module at the server, the message including at least the data pertaining to the interoperability between the mobile communications device and the vehicle.

14. A device-vehicle interoperability verification system, comprising:
a mobile communications device including a tool to obtain vehicle information pertaining to a vehicle within which the mobile communications device is being used or is going to be used;
an application resident on the mobile communications device, the application including computer readable code, embedded on a tangible, non-transitory computer readable medium, for transmitting i) the vehicle information and ii) mobile communications device identification information to a server;
a data aggregator at the server including or associated with processing equipment including computer readable code, embedded on a tangible, non-transitory computer readable medium, for:
querying i) a database to obtain an interoperability file including data pertaining to an interoperability between the mobile communications device and the vehicle or ii) a structured query language (SQL) database for data pertaining to the interoperability between the mobile communications device and the vehicle;
processing the data obtained during the querying of the database or the structured query language database; and determining that i) the mobile communications device is at least partially compatible with the vehicle or ii) the mobile communications device is at least partially incompatible with the vehicle; and a communications module at the server to send a message to the mobile communications device, the message including the data pertaining to the interoperability between the mobile communications device and the vehicle.

15. The system as defined in claim 14 wherein the tool is a radio frequency identification reader to read a radio frequency identification tag associated with the vehicle, the radio frequency identification tag including a bar code that contains the vehicle information.

16. The system as defined in claim 14 wherein the tool is a camera to capture a digital image of a vehicle identification tag associated with the vehicle, the vehicle identification tag containing the vehicle information.

17. The system as defined in claim 14 wherein the tool is a keypad or touchpad to enable manual input of the vehicle information into the mobile communications device.

18. The system as defined in claim 14 wherein the tool is a microphone to receive the vehicle information as verbal input.

19. The system as defined in claim 14 wherein the data aggregator further includes computer readable code, embedded on a tangible, non-transitory computer readable medium, for determining from the data pertaining to the interoperability that the mobile communications device is not compatible with the vehicle, and wherein the message further includes additional data chosen from a suggestion for how to make the mobile communications device compatible with the vehicle or a suggestion of an other vehicle that the mobile communications device is compatible with.

20. The method as defined in claim 1 wherein the mobile communications device is selected from the group consisting of a smartphone, a tablet computer, and a laptop computer.

* * * * *